United States Patent
Bonwit et al.

(10) Patent No.: US 7,329,392 B2
(45) Date of Patent: Feb. 12, 2008

(54) DEVICE AND METHOD FOR HANDLING REACTION COMPONENTS

(75) Inventors: Neville A. Bonwit, Mountain View, CA (US); Ronald E. Pelrine, Boulder, CO (US); John S. Bashkin, Fremont, CA (US)

(73) Assignee: SRI International, Menlo Park, CA (US)

( * ) Notice: Subject to any disclaimer, the term of this patent is extended or adjusted under 35 U.S.C. 154(b) by 294 days.

(21) Appl. No.: 10/274,674

(22) Filed: Oct. 18, 2002

(65) Prior Publication Data

US 2008/0003143 A1 Jan. 3, 2008

Related U.S. Application Data

(60) Provisional application No. 60/346,219, filed on Oct. 19, 2001.

(51) Int. Cl.
*B01L 3/00* (2006.01)

(52) U.S. Cl. ............... 422/102; 436/525; 436/526; 210/222; 210/695

(58) Field of Classification Search .......... 422/89–104; 221/212; 436/526, 525, 566, 806; 210/695, 210/222; 209/217, 225, 226
See application file for complete search history.

(56) References Cited

U.S. PATENT DOCUMENTS

| | | | | |
|---|---|---|---|---|
| 3,996,140 | A * | 12/1976 | Josefsson et al. ............ 210/205 |
| 4,272,510 | A * | 6/1981 | Smith et al. ................. 427/598 |
| 4,568,192 | A * | 2/1986 | Kudermann et al. ......... 366/146 |
| 4,673,651 | A * | 6/1987 | Rothenberg et al. ...... 435/305.2 |
| 4,895,650 | A * | 1/1990 | Wang ........................... 210/222 |
| 4,988,618 | A * | 1/1991 | Li et al. ........................... 435/6 |
| 5,779,907 | A * | 7/1998 | Yu ................................ 210/695 |
| 5,912,129 | A * | 6/1999 | Vinayagamoorthy et al. .. 435/6 |
| 5,922,617 | A * | 7/1999 | Wang et al. .................. 436/518 |
| 5,976,369 | A * | 11/1999 | Howe et al. ................. 210/222 |
| 5,981,297 | A * | 11/1999 | Baselt ......................... 436/514 |
| 6,027,695 | A * | 2/2000 | Oldenburg et al. .......... 422/102 |
| 6,132,607 | A * | 10/2000 | Chen et al. ................. 210/208 |
| 6,176,609 | B1 * | 1/2001 | Cleveland et al. ........... 366/273 |
| 6,193,892 | B1 * | 2/2001 | Krueger et al. ............. 210/695 |
| 6,409,925 | B1 * | 6/2002 | Gombinsky et al. ........ 210/695 |
| 6,468,809 | B1 * | 10/2002 | Prinz et al. ................. 436/526 |
| 6,500,343 | B2 * | 12/2002 | Siddiqi ........................ 210/695 |
| 6,514,416 | B1 * | 2/2003 | Harradine et al. ........... 210/695 |

(Continued)

FOREIGN PATENT DOCUMENTS

WO    WO 9940444 A1 *  8/1999

*Primary Examiner*—Jill Warden
*Assistant Examiner*—Dwayne K Handy
(74) *Attorney, Agent, or Firm*—Perkins Coie LLP

(57) ABSTRACT

An apparatus and method for performing successive chemical or biochemical operations in an automated or semi-automated format are disclosed. The apparatus includes (i) a substrate having two or more wells, where each well is separated from adjacent well(s) by an energy barrier, (ii), a magnetic bead having a surface on which at least one of said operations is performed, and (iii) electromagnets positioned adjacent said wells, for use in producing controlled-time electromagnetic fields in one or more selected wells. A control unit operatively coupled to the electromagnets functions to produce controlled-time electromagnetic forces on the bead that are effective to transfer the bead from one well to another across the energy barrier and optionally, to agitate the bead within a well.

19 Claims, 7 Drawing Sheets

U.S. PATENT DOCUMENTS

| | | | |
|---|---|---|---|
| 6,607,662 B1 * | 8/2003 | Ikeda et al. | 210/175 |
| 6,645,431 B2 * | 11/2003 | Astle | 422/99 |
| 6,649,419 B1 * | 11/2003 | Anderson | 436/526 |
| 6,672,458 B2 * | 1/2004 | Hansen et al. | 209/224 |
| 6,776,174 B2 * | 8/2004 | Nisson et al. | 134/104.4 |
| 6,805,840 B1 * | 10/2004 | Tajima | 422/100 |

* cited by examiner

DEVICE AND METHOD FOR HANDLING REACTION COMPONENTS

CROSS-REFERENCE TO RELATED APPLICATION

This application claims priority under 35 U.S.C. §119(e) to U.S. Provisional Patent Application No. 60/346,219, filed 19 Oct. 2001, which is herein incorporated by reference in its entirety.

FIELD OF THE INVENTION

This invention relates to a device and method for manipulating reagents, that is, handling reaction components, particularly for use in manipulating analyte reagents.

BACKGROUND OF THE INVENTION

In the diagnostics field, there are a large number of important analytes relating to human disease condition, genetic makeup or gene activity, environmental factors and biowarfare agents. In many cases, these analytes can only be detected, in a practical sense, by multi-step processing in solution. For example, when assaying a particular cell or tissue mRNA transcript, various processing steps, such as cell lysis, isolation of mRNA transcripts, selective amplification of known-sequence transcripts and detection may be required, each requiring a separate liquid-phase reaction or processing step.

Heretofore, the most widely used and available approaches for carrying out multi-reaction assays and reagent manipulations of thus type have been fairly user intensive, requiring a user to set up different reagent vessels, transfer solutions or suspensions from one vessel to another, agitate some vessels during washing steps, and keep track of reaction times required in each vessel. The time and cost of these procedures is one limitation of their use. In addition, the sample amounts needed in these types of assays can be significant. Most restrictive, perhaps, is the problem that these procedures are impractical or impossible in many point-of-care (POC) settings, such as small clinics, screening centers, or battlefield settings.

Although automated microfluidics devices for carrying out multi-step liquid-phase reactions have been developed, and in some cases, commercialized, these systems tend to be fairly expensive, require special control and detection instruments, and have limited adaptability in terms of user-directed changes in reagents and analytes to be detected or reagents to be manipulated.

For these reasons, there exists a continued need for a low cost, reliable, automated, flexible apparatus for chemical handling and processing, especially in the diagnostic and pathogen detection areas, and especially for POC applications.

SUMMARY OF THE INVENTION

The invention includes, in one aspect, an apparatus for performing successive chemical or biochemical operations. The apparatus includes a substrate having two or more wells, where each well is separated from adjacent well(s) by an energy barrier; a magnetic bead having a surface on which at least one of the operations is performed, and electromagnets positioned adjacent the wells, for use in producing controlled-time electromagnetic fields in one or more selected wells. A control unit is operatively coupled to the electromagnets, for applying controlled-time currents to selected ones of the electromagnets, to produce controlled-time electromagnetic forces on the bead that are effective to transfer the bead from one well to another across said energy barrier.

The bead preferably has at least one surface in the 0.5 mm to 1 cm size range, and preferably has a cylindrical shape. The barrier may be a liquid/gas interface or, in another embodiment, a physical barrier formed on said substrate, preferably a smoothly contoured hill. In this embodiment, the bead may have a substantially round cross section, e.g., cylindrical shape, and the magnetic forces are effective to orient the bead within a well for rolling movement as the bead is transferred from one well to another.

The electromagnets may include overhead electromagnets positioned directly above each well, and lower or well electromagnets positioned on opposite sides of each well. The control unit, in moving a bead from a first well to a second well, may apply controlled-time currents to each of the (i) lower electromagnet between the first and second wells, the upper electromagnet directly above the second well, and a lower electromagnet adjacent the second well. The control unit may be further operable to apply controlled-time currents to selected ones of the electromagnets, to produce controlled-time electromagnetic forces on the bead that are effective to agitate the bead within a well, e.g., to shake or rotate the bead within the well.

One or more of the wells may include a heating element that can be activated by the control unit to heat liquid in the well. With bead agitation within a heated well, heat equilibration can be rapidly achieved. The electromagnets themselves may be used to generate heat in the wells.

The apparatus may further include a detector for detecting the presence or absence of an analyte-dependent signal in at least one well.

For use in processing two or more analytes in a sample containing multiple components, the substrate may include a central well for receiving the sample, a plurality of analyte processing wells, and disposed between the central well and each analyte-processing well, one or more intermediate wells. In this embodiment, the control may operate to (i) move a bead into and out of a the sample well from a selected intermediate well, (ii) move the bead from the selected intermediate well to the associated analyte-processing well, (iii) move the bead from the associated analyte-processing well, back to the intermediate well, and (iv) repeat steps (i)-(ii) for one or more other beads and respective analyte processing wells.

In another aspect, the invention includes a method for performing successive chemical or biochemical operations. The method includes first placing first and second different reagents in first and second different wells of a substrate having two or more wells, where each well is separated from adjacent well(s) by an energy barrier; and where one of said wells contains a magnetic bead having a surface on which at least one of the operations or manipulations is performed.

After the bead has interacted with reagent(s) in the first well, it is transferred to the second well by applying controlled-time currents to selected electromagnets positioned adjacent the wells, to produce controlled-time electromagnetic forces on the bead that are effective to transfer the bead from the first to the second well.

The method may further include applying controlled-time currents to selected ones of the electromagnets, to produce selected controlled-time electromagnetic forces on the bead that are effective to agitate the bead within a well, e.g., rotate the bead, thus to stir the liquid contents of that well.

For use in processing a cellular sample for detecting one or more mRNA transcripts, the substrate may include a sample-receiving well, an analyte processing well, and one or more intermediate wells disposed between the sample-receiving well and the analyte-processing well, and the bead may be coated with a polydT sequence. Here the method includes adding the cellular sample to the sample well, under conditions effective to allow sequence-specific binding of transcripts in the sample to said bead, transferring said bead to the intermediate well, where the bead is washed to remove non-specifically bound sample material, and transferring the bead to the analyte-processing well. The analyte processing well may be heated to release transcript bound to the bead. The method may further include amplifying the released transcript in the analyte-processing well.

For use in processing a body-fluid sample for detecting one or more non-nucleotide analytes, the substrate includes a sample-receiving well, an analyte processing well, and one or more intermediate wells disposed between the sample-receiving well and the analyte-processing well, and the bead is coated with a binding agent capable of binding specifically to the analyte. The method may include adding the sample to the sample well, under conditions effective to allow binding of the analyte to the bead, transferring the bead to the intermediate well, where the bead is washed to remove non-specifically bound sample material, and transferring the bead to the analyte-processing well.

For use in processing two or more analytes in a sample containing multiple components, the substrate may include a central well for receiving the sample, a plurality of analyte processing wells, and disposed between the central well and each analyte-processing well, one or more intermediate wells. Here the method may include (i) placing the sample and bead in the central well, (ii) moving the bead from the sample well to a selected intermediate well, (iii) moving the bead from the selected intermediate well to the associated analyte-processing well, (iv) moving the bead from the associated analyte-processing well, back to the central well through the intermediate well, and repeating steps (i)-(iv) for one or more other analyte-processing wells.

For use in purifying a selected compound from a mixture of compounds, the substrate may include a mixture-receiving well, a purification well, and one or more intermediate wells disposed between the mixture-receiving well and the purification well, and the bead is coated with a binding agent capable of binding specifically to the selected compound. The method may include adding the mixture to the mixture-receiving well, under conditions effective to allow compound-specific binding of the selected compound to the bead, transferring the bead to the intermediate well, where the bead is washed to remove non-specifically bound compounds, transferring the bead to the purification well, and removing the selected compound from the bead in the purification well.

In a related aspect, the invention includes a method of forming a magnetic bead composed of a magnetic core and a biocompatible coating formed over said core. The method includes placing the magnetic core in a first well of a substrate of an apparatus of the type described above. The first well includes a liquid silica composition, and thus serves to coat the core with a silica coating. Once coated, the core is transferred to the second well by applying controlled-time currents, to an adjacent well. Following this transfer, the core may be agitated under conditions effective to produce a substantially even silica coating while the silica composition hardens on the core. Alternatively, or in addition, the bead may be moved back and forth, in and out of the silica containing well, until a desired coating thickness is achieved.

These and other objects and features of the invention will become more fully appreciated when the following detailed description of the invention is read in conjunction with the accompanying drawings.

DETAILED DESCRIPTION OF THE INVENTION

Figure 1:
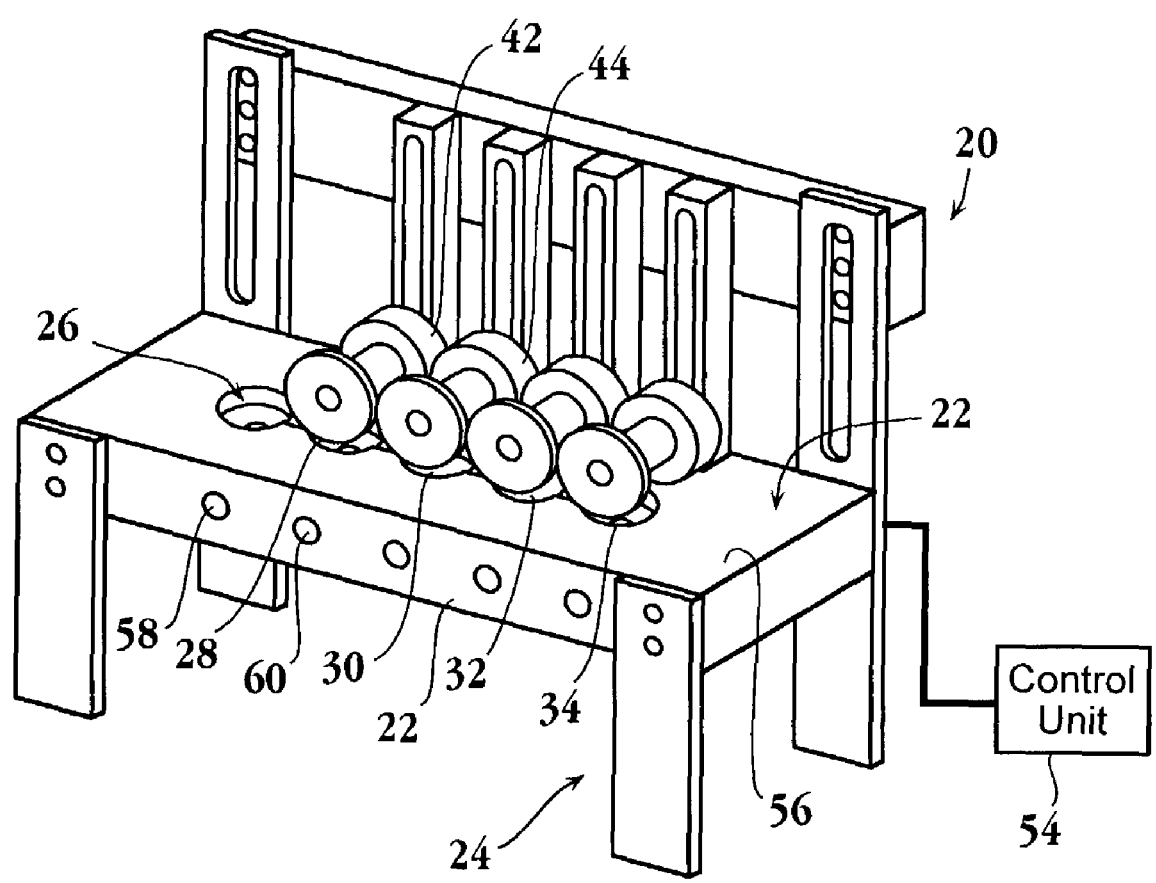
FIG. 1 is a perspective view of one embodiment of an apparatus constructed in accordance with the invention.

FIG. 1 is a perspective view of an apparatus 20, constructed in accordance with the invention, for performing successive chemical or biochemical manipulations. The apparatus includes a substrate 22 which is supported on a stand 24, and which provides a plurality of wells 26, 28, 30, 32, and 34, seen also in FIG. 2 and FIG. 3A. As will be seen below, adjacent wells in the substrate are each separated by a physical barrier or peak, such as barrier 36 separating wells 26, 28, and barrier 38 separating wells 28, 30.

A magnetic bead in the apparatus, described in detail with respect to FIGS. 4A and 4B below, has a surface on which at least one of the chemical/biochemical manipulations is performed, typically involving a surface-bound binding agent which can bind selectively to one or more analyte components contained in a substrate well. In particular, the bead (i.e., magnetic object or particle) has a permanent magnet core that is coated by a biocompatible coating having surface-bound or surface-accessible molecule agents that bind or otherwise interact with chemical and/or biological reagents of interest in a substrate well. The coating is generally based on silica with additional derivatization for attachment of surface molecules. A typical bead is a cylinder 2.0 mm in diameter and 1.0 mm in thickness.

Figure 2:
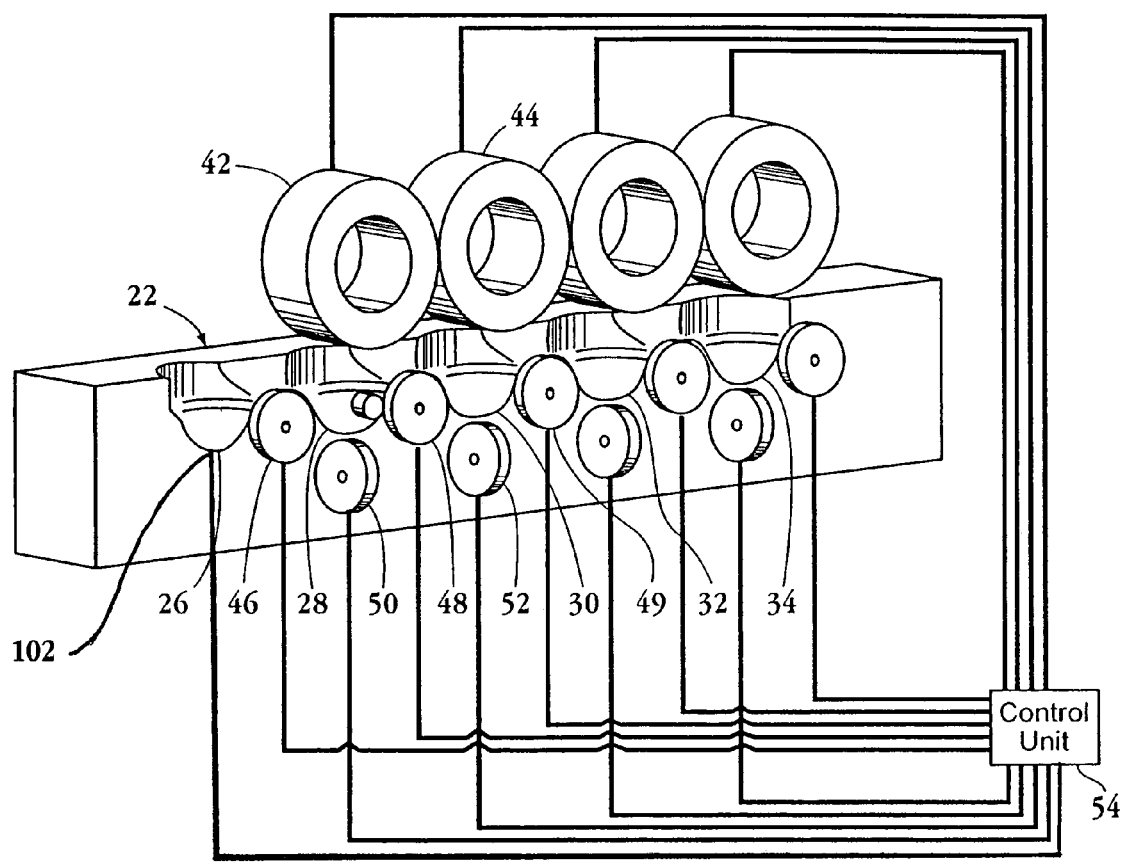
FIG. 2 is a perspective view of the apparatus in FIG. 1, showing the orientation of electromagnets with respect to the wells in the apparatus.

Also forming part of the apparatus, for use in moving the magnetic bead from well to well, and for use in agitating a bead within a well are three groups of electromagnets, seen best in FIG. 2, and referred to herein as overhead pop-out electromagnets, such as electromagnets 42, 44, lower or well pop-out electromagnets, such as electromagnets 46, 48, and spin electromagnets, such as electromagnets 50, 52. As seen, each overhead pop-out electromagnet, such as electromagnet 42, is positioned directly above one of the substrate wells, such as well 28. As the name implies, the overhead pop-out electromagnets are used in lifting a bead out of an adjacent well, so it can be dropped into the underlying well. Each lower pop-out electromagnet, such as electromagnet 46, is disposed between two adjacent wells, such as wells 26, 28, directly below the barrier separating the two wells. As the name implies, the lower pop-out electromagnets are used in transferring a bead from one well to an adjacent one over the intervening barrier, by drawing a bead to one or another side of a well. Each spin electromagnet, such as electromagnet 50, is disposed directly below an associated well, such as well 28. As the name implies, the spin electromagnets are operable to spin a bead within the associated well. The upper pop-out electromagnets are used to spin the magnet as well; the upper pop-out electromagnets and spin electromagnets work together to spin or agitate the magnet.

With continued reference to FIG. 2, each of the electromagnetic electromagnets in the apparatus is under the control of a control unit 54 which is designed to carry out sequential activation of selected overhead, lower, and spin electromagnets, to effect desired bead motion during operation of the apparatus, by supplying controlled-time currents to selected ones of the electromagnets, that is currents that are applied for a controlled period of time, typically 20-200 msec. The design and operation of the control unit in controlling the electromagnets, to effect desired bead motion, will be apparent from the operation of the control unit in bead movement, as detailed below.

The peaks separating adjacent wells in the substrate act as energy barriers which serve to confine a bead within a given well until acted on by external magnetic forces. In this case, with reference to FIG. 7, the energy barriers are smoothly-contoured 108 (sinusoidal-shaped) physical barriers formed in the substrate. In other embodiment, the energy barrier may be a liquid/gas interface 106 which acts to confine a bead within a discrete liquid "well" 104 until acted on by external magnetic fields. The energy barrier may include a combination of physical and liquid/gas interface forces that act to confine a bead to a well. Alternatively, or in addition, the energy barrier may be an electromagnetic field which has a bead-capturing component which remains "on" to confine a bead to a well (region) and which is switched off when the bead is to be transferred to an adjacent well.

In contrast to motion through a liquid, motion from a liquid well through air (pop-out) and back into a different liquid well (pop-in) requires higher magnetic forces because of energy barriers such as the liquid-air interface. Popping out of a well and popping back in can be accomplished, however, by driving sharp, high power pulses of current through a small electromagnet. The sharp, high magnetic force thus generated is sufficient to transfer even a small magnet across the liquid-gas interface. Although the electromagnet power is high during the pop-out pulse, the duration is short on the order of 100 ms, so very little energy is needed and heating is minimal.

In one preferred embodiment, the bead has a rolling magnet configuration that allows the magnet to roll along a selected axis as it is transferred from well to well. The magnet is typically cylindrical in shape, although not so limited, and is magnetized along its axis, as described further below with respect to FIGS. 4A and 4B. The electromagnets are designed to provide a controlled magnetic field whose component along the magnet's axis increases perpendicular to the axis. Thus, the magnet is magnetically pulled in the direction of cylindrical rolling. The magnet can be popped-out and transferred between liquid wells, as well as rotated or agitated for mixing purposes.

Figure 3A:
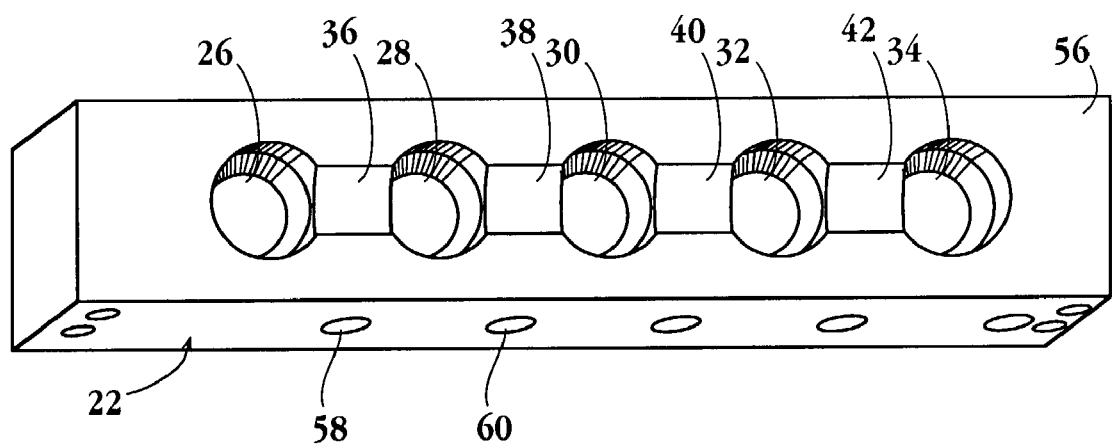
FIG. 3A is a perspective view of the well block forming the substrate of the apparatus, as seen from the front (or side) and top of the block.
Figure 3B:
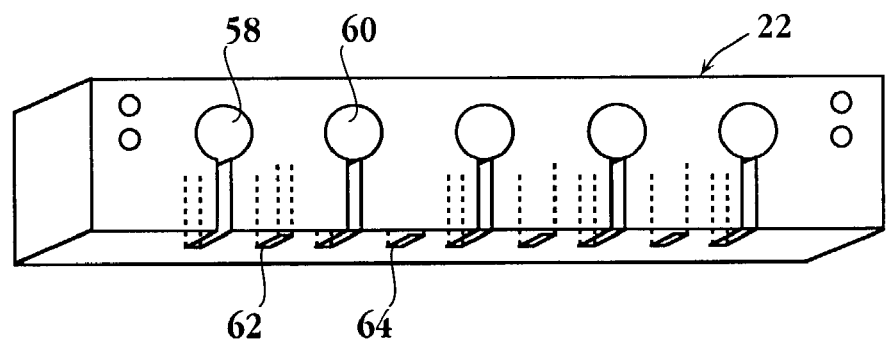
FIG. 3B is a perspective view of the well block of the apparatus, as seen from the back and bottom of the block.

FIGS. 3A and 3B show substrate 22 separated from other parts of the apparatus, as seen from a front (or side) and top view (FIG. 3A), and a back and bottom view (FIG. 3B). As seen in FIG. 3A the top surface of the substrate has formed therein a plurality of wells, such as wells 26, 28, disposed in a planar surface 56 of a non-magnetic material such as hydrophobic plastic or the like. The wells have a typical operational volume of between 100-500 µl, typically 250 µl. The well-to-well distance, measured from the centers of adjacent wells, is typically about 9 mm to 18 mm. The wells are separated physically by a peak or hump that is raised in relation to the bottom of the well yet not reaching the planar surface of the substrate in which the wells are disposed. Accordingly, when viewed from the side, the surface contour of the wells and barriers resembles a cycloid, e.g., sinusoidal graph. Also as noted above, each of the humps or peaks represents a physical energy barrier between adjacent wells.

As seen in FIG. 2, one or more of the wells can be equipped with heating elements 102, e.g., resistive heating elements that can be activated to produce a desired level of heating in one or more of the wells. The heating element is under the control of the control unit. The lower pop-out and other electromagnets may themselves be used for heating in some embodiments provided the current driven through them for heating does not interfere with currents used for motion control of the magnet. This may be accomplished (depending on the heating needed) by driving a low level of current though the electromagnets when they are not being used for motion control, or by using a high frequency AC current through the electromagnets (when not used for motion control) that does not exert a net magnetic force on the magnet.

Formed in the side of substrate 22, as seen in FIG. 3A, is a plurality of cylindrical holes, such as holes 58, 60, into which the lower-pop-out electromagnets, such as electromagnets 46, 48, respectively, are received, to place these electromagnets directly below corresponding substrate peaks, such as peaks 36, 38, respectively, as seen in FIG. 2. Formed in the lower side of the substrate, as seen in FIG. 3B, is a series of slots, such as slots 62, 64, into which are received the spin electromagnets, such as electromagnets 50, 52, respectively, to place these electromagnets immediately below the corresponding wells, as seen in FIG. 2.

As shown in FIG. 2, each spin electromagnet is placed about 0.04" underneath the well, while each overhead electromagnet is placed about 0.375" above the well, perpendicular to the spin electromagnets and in an orientation such that when viewed from above, the two electromagnets make a "+" sign. The spin electromagnet's orthogonal orientation with respect to the larger electromagnet is in contrast to the lower electromagnet, which is positioned for transporting an object. As further seen in FIG. 2, the spin electromagnets are oriented to produce magnetic flux lines in a direction normal to the field lines of the two pop-out magnets.

Each of the electromagnetic electromagnets has a conventional construction, meaning a magnetic core wrapped with a conductor wire winding or an air-core electromagnet (not shown). More generally, the smaller electromagnets are constructed, in one embodiment, of approximately 215 turns of 36 Gauge (0.0050" diameter) enamel-coated magnet wire with dimensions as follows: O.D.=0.3"; I.D.=0.05"; thickness=0.065". The larger electromagnets are constructed of approximately 525 turns of 32 Gauge (0.008" diameter) enamel-coated magnet wire with dimensions as follows: O.D.=0.70"; I.D.=0.4"; thickness=0.3". The electromagnet dimensions described herein are examples of one embodiment and are not meant to be limiting. The technology can be easily adapted to other electromagnet dimensions.

Precise timing and switching of the currents passed from the control unit through each electromagnet is controlled in one embodiment through two 24-channel digital I/O boards interfaced to a laptop or like computer or processor (not shown). A magnet resides in the first well and, upon addition of a liquid sample and reagents to the remaining wells, can be transferred via a rolling mechanism between any adjacent wells. The electrical current passing through the electromagnets, as manipulated by the controller, forms a controlled magnetic field with a component aligned with the magnet's longitudinal axis that increases perpendicular to the magnet's longitudinal axis. The rolling mechanism is performed so as to prevent splashing of the solutions and minimize solution carryover between wells.

A magnetic bead can be manipulated within a fluid environment by pulsing power through the electromagnets in a sequenced fashion. By connecting the electromagnets to a power amplifier that is in turn connected to a computer or processor (together, the control unit), the electromagnets can be digitally pulsed on and off. In this embodiment during the "on" state, the electromagnet electromagnets received approximately 2.75 Volts and 350 milliamps of voltage and current, respectively.

Considering now the operation of the control unit in manipulating a bead, assume that a bead is placed in well 28 on the substrate (second from the left in the figures), which will serve as a sample well, and is allowed to react with reagents in this well under conditions in which the molecules carried on the surface of the bead interact with the selected reagent components. For example, if the molecules bound to the bead are enzymes, the bead may effect a desired enzymatic reaction of one of the well components. If the bound molecules are binding agents, e.g., an antibody, oligonucleotide, receptor, or small-molecule ligand, the complementary binding component(s) in the well may bind selectively to the bead surface. If the bead surface is coated with an inhibitory molecule, e.g., a drug or antisense compound, the presence of the bead may be effective to inhibit a target reaction or event in the sample well.

Following this reaction, the bead is now transferred to a second well, (target well) typically a washing well, where the bead may be washed, e.g., to remove non-specifically bound material, or further process the bead. To accomplish the movement of the magnetic object from one well to the next the wire electromagnets are pulsed from the control unit as follows. The approximate activation times, referenced from time zero are given beside each operation, for bead movement from well 28 to well 30.

1. Turn on lower pop-out electromagnet 48 under peak 38 between wells 28, 30 to draw the bead to the side of the peak between the two wells, time zero to 10 msec;

2. Turn on the overhead pop-out electromagnet 44 over well 30 to pull the object out of the sample well; time 10 msec to 20 msec;

3. Delay of 5 msec;

4. Turn on the lower pop-out electromagnet under peak 40 to pull the object toward the target well, time 25 msec to 35 msec;

5. Delay of 65 msec;

6. Turn off overhead electromagnet 40 over the target well to allow the object to fall into the target well, at time 100 msec to 110 msec;

7. Turn off the lower electromagnet under peak 38 to let the object roll down the peak hump into the target well, time 110 msec to 120 msec;

8. Delay of 5 msec; and

6. Turn off the lower electromagnet under peak 40 to pull the object to the center of the target well, time 125 msec to 135 msec.

The transfer of the object from the source to the target well takes approximately 0.135 seconds to complete.

There is an approximate 300 msec settling time delay at the start and end of the procedure, so the total time would be 0.3+0.135+0.3=0.735 seconds. The start and end delay may be reduced.

In addition to moving the magnetic object from one well to another well, the magnetic object may be manipulated within the well, particularly for purposes of agitating the bead in a well. In one embodiment, using two or more wire electromagnets a magnetic field can be generated for rotating, spinning or agitating a magnetic object inside a well. As more electromagnet electromagnets are added to the device the precision and control of object manipulation increases. A single wire electromagnet can be used, but smooth rotation may be compromised.

The pulsing sequence for spinning a magnetic object is as follows. Compass directions are given to indicate the orientation of the object (through a face of the object), with the North-South line parallel to the axis of the large electromagnet 42. The words "forward" and "backward" refer to the direction of the current in the electromagnet.

The amount of time that each electromagnet is on depends on the spin speed. The following is based on a non-delay command time of 5 msec per command. To turn on a electromagnet, set it to forward (5 msec), turn it on (5 msec), and wait for a delay (the spin speed) 10 msec for about 12 Hertz (using 0 msec for execution of commands).

1. Turn on overhead electromagnet forward (West), from time zero to 20 msec;

2. Turn on spin electromagnet forward (Southwest), from time 20 to time 40 msec;

3. Turn off overhead electromagnet (South), at time 40 msec to 55 msec;

4. Turn on overhead electromagnet backward (Southeast), from time 55 msec to time 75 msec;

5. Turn off spin electromagnet (East); at time 75 msec to 90 msec

6. Turn on spin electromagnet backward (Northeast), from time 90 msec to time 110 msec;

7. Turn off overhead electromagnet (North), at time 110 msec to 125 msec;

8. Turn on overhead electromagnet forward (Northwest), from time 125 msec to time 145 msec;

9. Turn off spin electromagnet (West), at time 140 msec to 155 msec;

To make the object spin more than one revolution, steps 2-9 are repeated. By varying the rate at which the electromagnets are pulsed, the object can be made to spin from fractions of a Hertz to about 30 Hertz. It is also possible to use an analog signal to run a sine wave current through each electromagnet wherein the sine waves for each electromagnet are 90 degrees out of phase. This non-pulsed approach allows the object to spin smoothly at rates below 5 Hertz. By adding more electromagnets with various orientations of the face of the electromagnets, the orientation and position of the magnetic object can be controlled with fine detail. Furthermore, in alternate embodiments, the electromagnets may be activated in such a sequence to produce a vibratory or agitated motion of the object rather than a spinning motion.

Sensors 112 for control and system monitoring may also be used in the system to enhance reliability, to flag a problem, or for more complex control of the magnetic beads 66 and 76. Optical sensors, such as LED or laser sensor devices, for sensing the presence or absence of a millimeter-size magnetic bead are known in the prior art and could be incorporated into the system described here. If the bead was not recorded by the optical sensor at the expected position (e.g. between two wells) at the expected time, an alarm might sound to notify an attendant. Conversely, if the sensor did register the magnetic bead correctly, the data might be recorded for system verification and record keeping purposes, particularly for systems performing complex chemical processes. Optical and other sensors are also known in the prior art which can measure not just presence or absence of the magnetic bead, but also more precise motion parameters such as accurate bead position or bead velocity. Such parameters may be used by the control unit to better control the magnetic bead, for example to minimize splashing from too high velocity, or to minimize power consumption in the electromagnetic electromagnets by not driving more power than is needed to achieve the desired motion.

Figure 7:
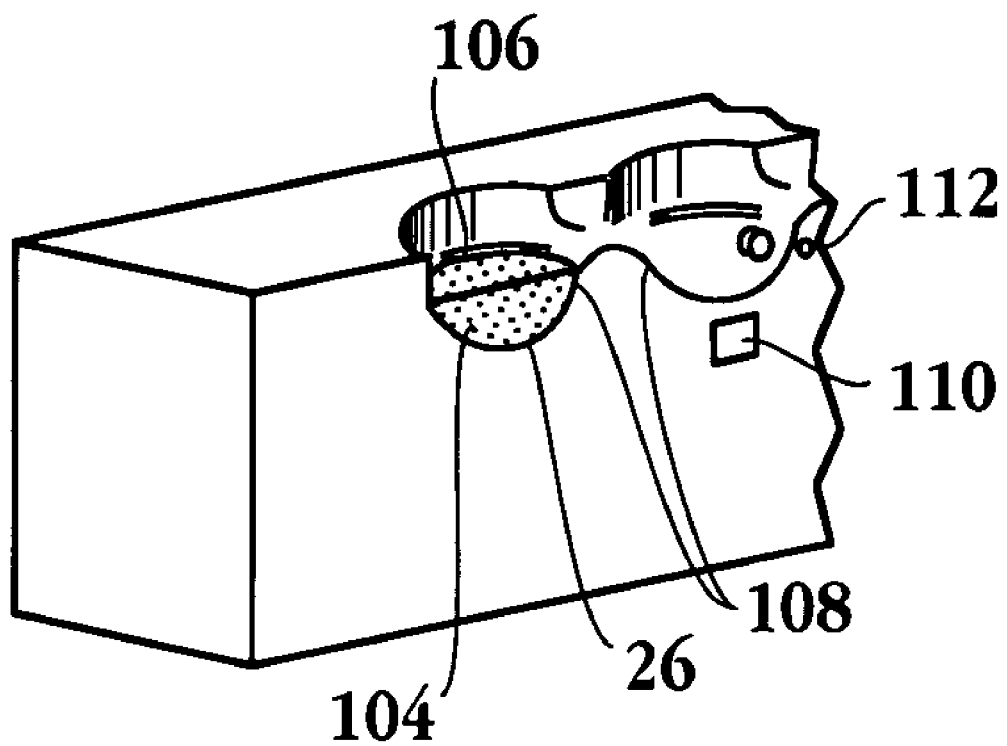
FIG. 7 is a partial perspective view of the apparatus in FIG. 2.

As seen in FIG. 7, the apparatus may further include a detector 110 for detecting the presence or absence of an analyte-dependent signal in at least one well.

Figure 4A:
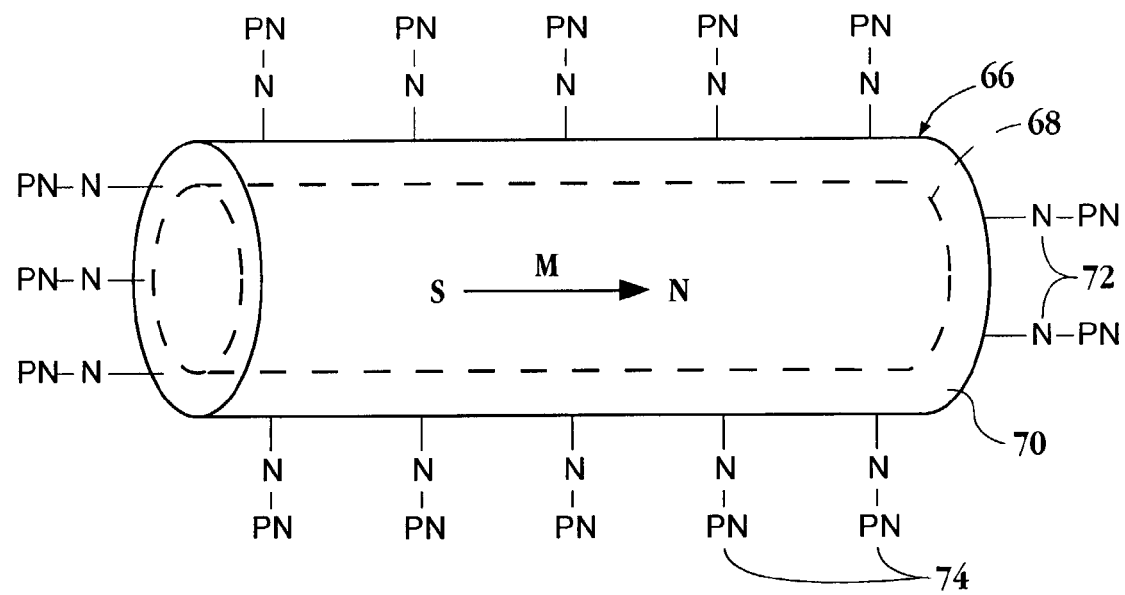
FIGS. 4A and 4B illustrate cylindrical and spherical magnetic beads suitable for use in the invention.
Figure 4B:
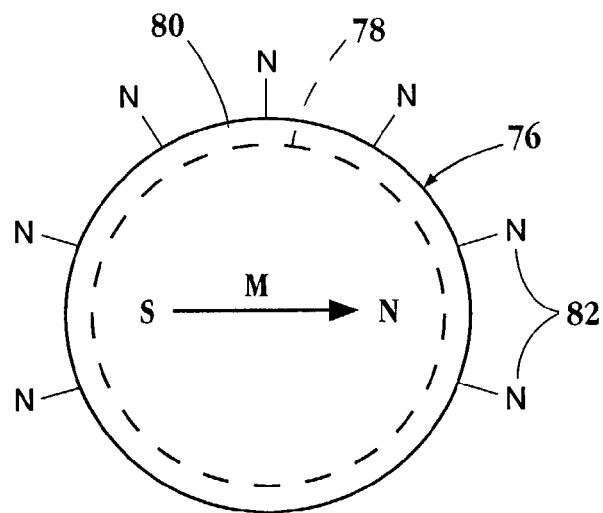

FIGS. 4A and 4B are enlarged perspective views of cylindrical and spherical magnetic beads 66, 76, respectively, designed for use in the present invention. Bead 66 includes a cylindrical NdFeB-based ferromagnetic core 68 that is magnetized along its axis, as indicated by the magnetic moment vector in the figure. The core is covered by a silica coating 70 that may be applied conventionally, e.g., by dipping the core in a liquid silica composition and allowing the coating to dry. The coating, in turn, is chemically treated, conventionally, to introduce surface-active groups, such as amine, carboxyl, hydroxyl, or sulfhydryl groups, indicated at 72. These groups are used for surface attachment of reagent-specific molecules, such as oligonucleotides 74, to the surface of the beads. The bead has typical dimensions of between 0.5 mm and 1 cm diameter, and a similar width dimensional range.

Spherical bead 76 shown in FIG. 4B includes a spherical NdFeB-based ferromagnetic core 78 that is magnetized along its axis, as indicated by the magnetic moment vector in the figure. As above, the core is covered by a silica coating 80, which is derivatized with surface-active groups, such as amine groups indicated at 82, for attachment of reagent-specific molecules to the bead surface. The bead has typical dimensions of between 0.5 mm and 1 cm diameter.

According to one aspect of the invention, coated magnetic beads of the type just described may be prepared using the apparatus of the invention. In this method, a magnetic core is placed in the first substrate well in an apparatus of the type described above. The well includes a liquid silica composition, which coats the submerged core. Once coated, the core is transferred to a second well by applying controlled-time currents, to an adjacent well. Following this transfer, the core may be agitated under conditions effective to produce a substantially even silica coating while the silica composition hardens on the core. Alternatively, or in addition, the bead may be moved back and forth, in and out of the silica containing well, until a desired coating thickness is achieved.

Figure 5:
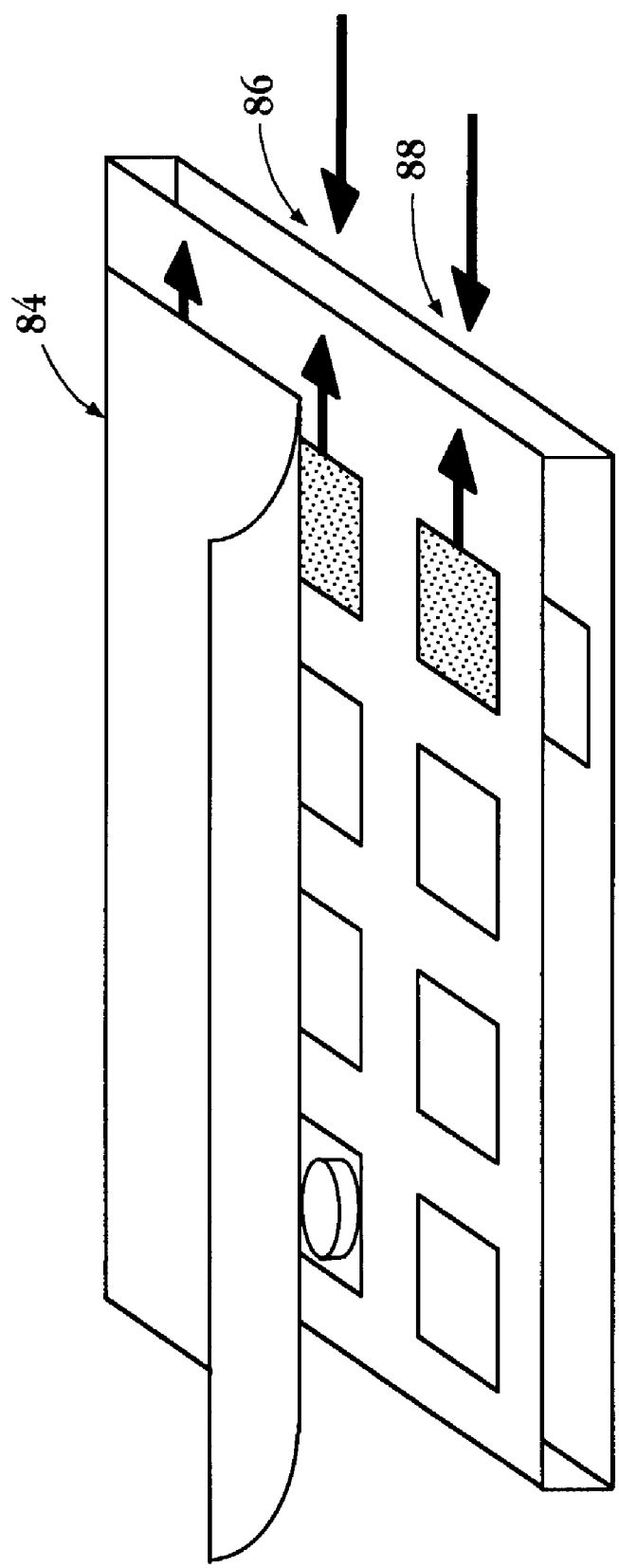
FIG. 5 is a perspective view of an embodiment of a substrate having different assay lanes.

FIG. 5 illustrates a substrate 84 constructed according to another embodiment of the apparatus invention. In this embodiment, the substrate includes two (or more) sets of wells, such as indicated at 86, 88 in the figures, where each set includes four individual wells. As above, the individual wells are se3parated by smoothly contoured barriers, and each set of wells is controlled by its own group of overhead, lower and spin magnets, allowing bead movement within each set to be individually controlled. As can be appreciated, this substrate allows simultaneous and independent bead processing in two or more groups of wells. Where adjacent wells in different sets of wells are separated by smoothly contoured barriers, the magnets may also be designed and operable for bead movement between wells in different sets.

Figure 6A:
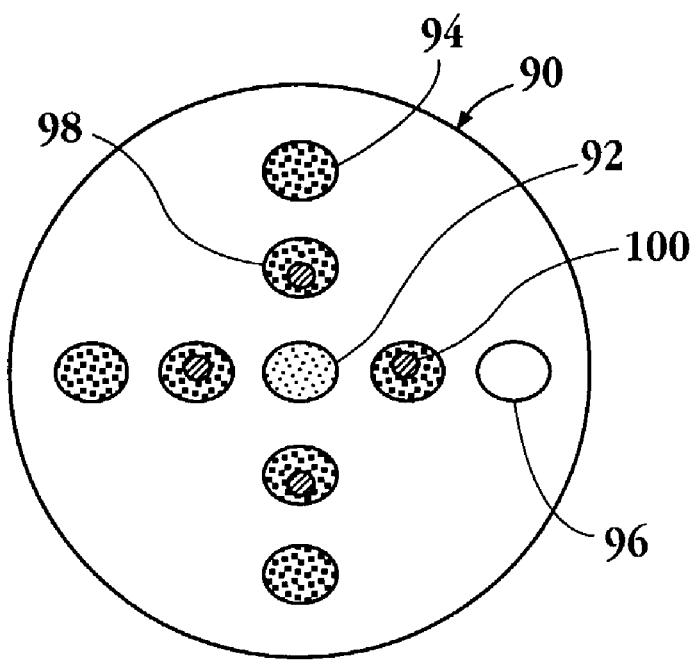
FIG. 6A is a plan view of a four-assay well configuration in one embodiment of the invention.
Figure 6B:
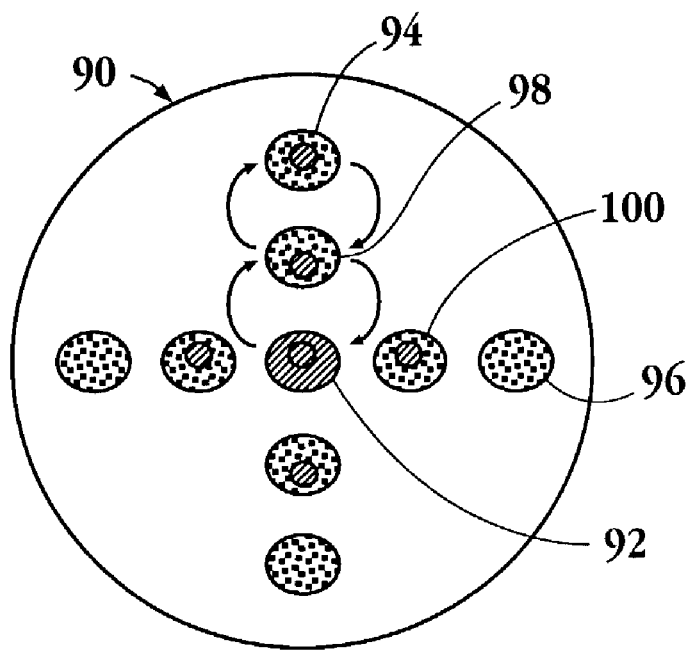
FIG. 6B indicates the direction of movement of a magnetic bead in the FIG. 5A configuration.

FIGS. 6A and 6B illustrate still another substrate embodiment for multi-analyte or multi-reagent processing. In this embodiment, a substrate 90 includes a central sample receiving well 92, a plurality of outer processing wells, such as wells 94, 96, and, positioned between well 92 and each outer well, one or more intermediate wells, such as intermediate well 98 between wells 92 and 94, and intermediate well 100 between wells 92 and 96. Although not shown here, the apparatus employing this substrate has smoothly contoured physical barriers between adjacent wells, and overhead, lower and spin magnets for controlling bead movement from the central well to adjacent intermediate wells, and from these wells, to the outer processing wells, and in the opposite direction as well, as indicated by the direction of arrows in FIG. 6B for one set of wells.

The embodiment just described may be employed, for example, where it is desired to analyze multiple analytes or classes of analytes, a single sample, or where it is desired to carry out multiple types of processing on a single sample. In the former case, a bead carrying one type of binding agent may be placed in the center well that contains a liquid sample with multiple analytes or other reagents to be tested or handled. The bead, after reacting with one of these components, is then moved successively from the center well, through an adjacent intermediate wash well, and to the associated processing well, then back to the intermediate wash well. This specifically removes one analyte from the sample and leaves it purified in the final processing or detection well. This bead movement may be repeated with each of the other beads until each has been moved through the sample and then out through their respective rinse and into their final processing/detection wells.

The control unit may be programmed to carry out a variety of assay or other reagent-handling protocols, depending on the nature of the operation desired and the format of the substrate. For example, in a simple purification procedure, the control unit will operate to move a bead placed in an initial sample well to an adjacent washing well, where the bead may be agitated, e.g., rotated, to remove non-specifically bound material, then move to an adjacent processing well where the bound material may be released from the bead, e.g., by heating or by the nature of the solution in the processing well. The bead may then be returned to the initial sample well for further processing.

For analyte detection of a known-sequence nucleic acid analyte, the processing well may contain amplification primers or the like to selectively amplify the known sequence, by repeated heating/cooling cycles carried out in the well. Alternatively, amplification primers may be supplied on the bead itself, where the bead is coated with oligonucleotides that bind both analytes of interest and primer sequences, or the primers may be introduced from another reagent bead that is moved into the processing well from another well. This latter embodiment illustrates a mode of operation of the device where the two or more beads carrying different reagents and/or analytes are brought into the same well, for exposing different combinations or reagents to one another in that well.

In addition to nucleic acid analysis, the apparatus and method are adaptable for detecting, measuring or utilizing a wide variety of analytes and other reagents, including antigens, enzymes, receptors, and small molecule drugs. In each case, the bead is designed either to bind to one of the reagents, for selective binding, or to interact with one of the reagents, so that the presence or absence of an event, preferably a detectable event, can be detected, measured, or utilized, e.g., in a subsequent reaction. The following nucleic acid analysis operations are representative or the versatility and options available from the system.

Here the substrate may include a plurality of parallel well sets, as in FIG. 5, or a hub-and-spoke arrangement as shown in FIG. 6, for separate assays for pathogen, RNA, genomic DNA, protein and other analysis, synthesis or purification functions. Upon being provided a specimen for analysis, a sample can be introduced to the first well of the desired assay lane. With a cover placed over the substrate, the substrate is placed operatively in the apparatus, and the control unit is set to carry out a selected set of bead transfer and mixing operations. For, example, a sample well may contain a lysis buffer to facilitate the breakdown of the sample and release the desired analyte, e.g., an mRNA transcript with a selected sequence. A magnetic bead, coated with an analyte binding molecule, e.g., an oligodT, is contacted with this sample under incubation conditions in which the bead surface molecules pick up mRNA transcripts by binding to the transcript with polyA tails. After this binding period, the bead is transported to an adjacent intermediate wash well, where non-specifically bound material is removed as the bead is rotated within the wash well.

With the lysis solution effectively removed from the bead, the bead and the bound transcripts are transported to an adjacent processing well containing an elution buffer that causes the analytes to be released from the object. This procedure has thus successfully isolated/purified transcripts from a cell lysis mixture. With the purification process complete, the bead is then returned to the sample well, leaving a purified solution of analytes in the processing well.

The device can thus quickly purify nucleic acids or other analytes from a variety of biological samples, including cancer biopsy specimens. The device requires no additional laboratory infrastructure, liquid dispensing, or operating expertise other than that necessary for obtaining a patient specimen. The device is capable of processing complex liquids (e.g., blood) or heterogeneous tissue samples and outputs purified NAs in solution. If required, both initial tissue homogenization and subsequent processing by RT-PCR can be easily integrated into the device. One embodiment of the device can be deployed as a simple, compact, integrated system for extracting and purifying NAs from a variety of sources within a POC context.

From the foregoing, it will be appreciated how various objects and features of the invention are met. The invention allows rapid, automated or semi-automated handling of liquid samples, for multi-step analyte reactions, chemical modifications or other multi-step reactions.

The invention allows for tailored reaction conditions, e.g., heating, within separate wells, and by bead agitation, rapid equilibration of reaction conditions, and other more complete washing of the bead carrier. The apparatus is easily adapted for multi-analyte assays or multiplexed assays using multiple-lane or radial well configurations of the type illustrated in FIGS. 5 and 6.

The bead size allows quantitative detection of even small amounts of analyte material, e.g., a given-sequence transcript. In particular, the overall size of the magnetic bead can be chosen such that the surface area of a single cylindrical magnet is nearly identical to that of $10^6$ 1 µm-diameter particles. It can be shown, for example, that a magnetic bead having a radius and thickness of 1 mm possesses about the same surface area as $10^6$ 1 µm-diameter particles. Thus, this single bead will yield the same DNA or RNA binding capacity as $10^6$ paramagnetic particles (e.g., Dynal objects), which is roughly the number used in the common paramagnetic bead protocols. While the NdFeB-based magnets offer the highest magnetic energy density of currently available magnets, enhancing the devices ability to manipulate the magnet in three-dimensional space, other like magnetic material can be used.

Although the invention has been described with respect to specific embodiments, it will be appreciated that various changes and modification can be made without departing from the invention as claimed.

The invention claimed is:

1. An apparatus for performing successive chemical or biochemical operations, comprising
    (a) a substrate having two or more wells, where each well is separated from adjacent well(s) by an energy barrier;
    (b) a magnetic bead having a surface on which at least one of said operations is performed,
    (c) well electromagnets positioned between said wells, said electromagnets being rotatable about a central, radial axis, for use in producing controlled-time electromagnetic fields in one or more selected wells, and
    (d) a control unit operatively coupled to said electromagnets, for applying controlled-time currents to selected ones of said electromagnets, to produce controlled-time electromagnetic forces on said bead that are effective to transfer the bead from one well to another across said energy barrier.

2. The apparatus of claim 1, wherein said bead has at least one dimension in the 0.5 mm to 1 cm size range.

3. The apparatus of claim 1, wherein when at least one of said two or more well contains a liquid, the controlled-time electromagnetic forces are effective to transfer the bead from one well to another across a liquid/gas interface.

4. The apparatus of claim 1, wherein said energy barrier separating said wells includes a physical barrier formed on said substrate.

5. The apparatus of claim 4, wherein said physical barrier is a smoothly contoured hill, said bead has a substantially round cross section, and said electromagnetic forces are effective to orient the bead within a well for rolling movement as the bead is transferred from one well to another.

6. The apparatus of claim 5, wherein said bead is a cylinder having a magnetic axis along the axis of the cylinder.

7. The apparatus of claim 5, further comprising an overhead electromagnet positioned above said wells.

8. The apparatus of claim 7, wherein said control unit, in moving a bead from first to second wells, applies controlled-time currents to each of the (i) well electromagnet disposed between the first and second wells, (ii) the overhead electromagnet positioned above the second well, and (iii) the well electromagnet between the second well and the next-adjacent well.

9. The apparatus of claim 7, wherein the control unit is further operable to apply controlled-time currents to selected ones of said well and overhead electromagnets, to produce selected controlled-time electromagnetic forces on said bead that are effective to agitate the bead within a well.

10. The apparatus of claim 9, wherein the selected controlled-time electromagnetic forces applied to said bead, for bead agitation, are effective to rotate the bead within a well.

11. The apparatus of claim 9, wherein at least one of said wells includes a heating element that can be activated by said control unit to heat a liquid material contained in that well.

12. The apparatus of claim 11, wherein the control unit is operable to agitate a bead in said well during or immediately following said heating.

13. The apparatus of claim 1, wherein at one of said wells includes a heating element that can be activated by said control unit to heat a liquid material contained in that well, and the control unit is operable to control the temperature in a well.

14. The apparatus of claim 1, which further includes a detector for detecting the presence or absence of an analyte-dependent signal in at least one well.

15. The apparatus of claim 1, for use in processing two or more analytes in a sample containing multiple components, wherein said substrate includes a central well for receiving the sample, a plurality of analyte processing wells, and disposed between the central well and each analyte-processing well, one or more intermediate wells.

16. The apparatus of claim 15, wherein said control unit is operable to (i) move a bead into the sample well and from the sample well to a selected intermediate well, (ii) move the bead from the selected intermediate well to the associated analyte-processing well, (iii) move the bead from the associated analyte-processing well, back to the intermediate well, and (iv) repeating steps (i)-(iii) for one or more other beads and their respective analyte-processing wells.

17. The apparatus of claim 15, wherein at least one of said analyte-processing wells contains a heating element for use, under the control of the control unit, in heating liquid in that well.

18. The apparatus of claim 1, further comprising a sensor for monitoring position or motion of the bead, wherein the sensor is disposed on the bead or the substrate or being remote from the substrate.

19. The apparatus of claim 1, further comprising a spin electromagnet positioned below said wells.

* * * * *